Figure 1:
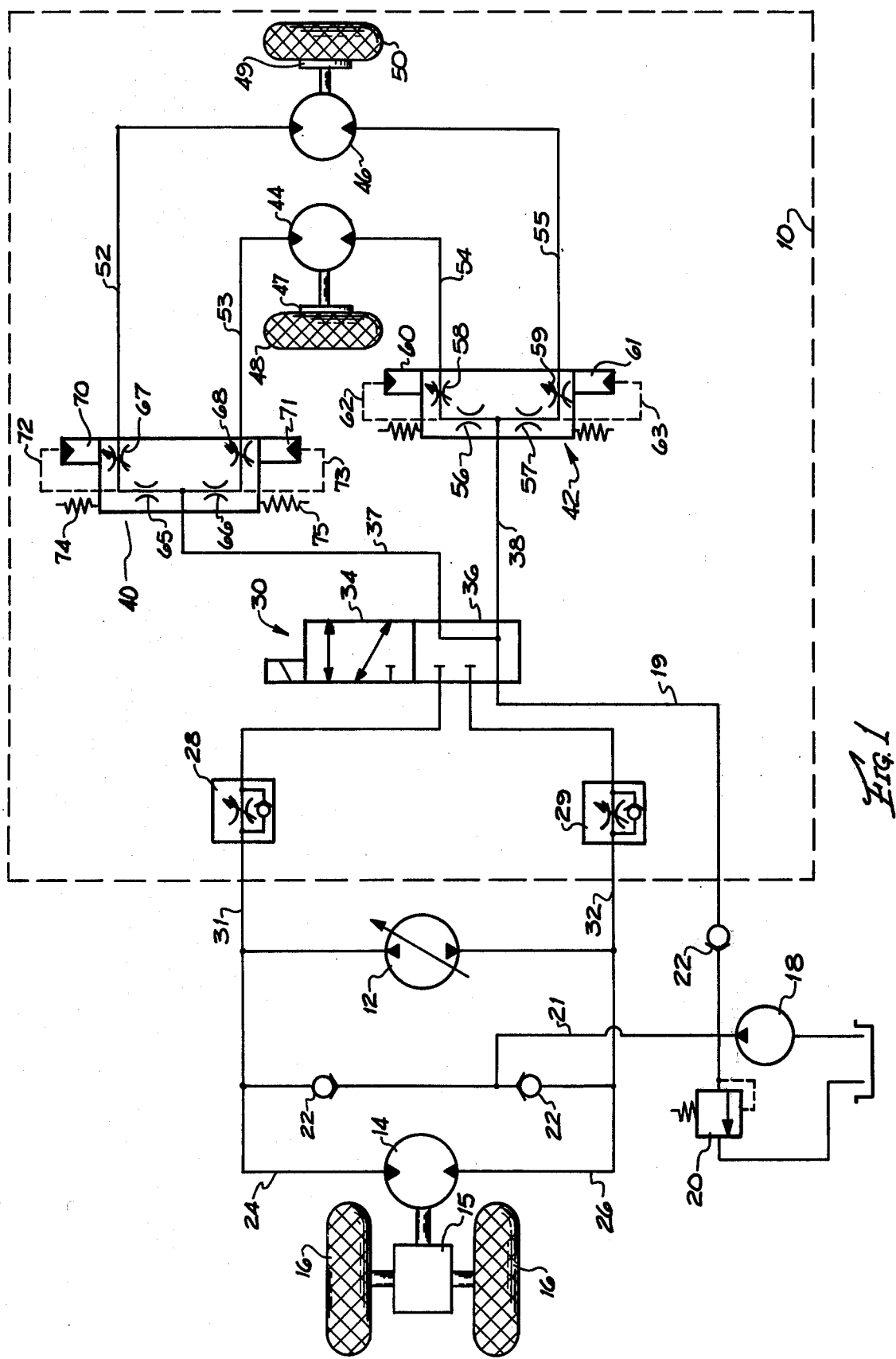

United States Patent [19]
Brewer

[11] 4,140,196
[45] Feb. 20, 1979

[54] AUXILIARY DRIVE SYSTEM
[75] Inventor: Willie F. Brewer, West Lafayette, Ind.
[73] Assignee: Parno Corporation, Brookston, Ind.
[21] Appl. No.: 804,459
[22] Filed: Jun. 7, 1977
[51] Int. Cl.² ............................................. B60K 25/04
[52] U.S. Cl. .................................... 180/44 F; 56/10.9; 60/484
[58] Field of Search ................... 180/44 F, 44 R, 66 R; 60/484, 464; 56/10.9

[56] References Cited
U.S. PATENT DOCUMENTS

| B 432,969 | 3/1976 | Campbell et al. | 180/44 F |
| 3,736,732 | 6/1973 | Jennings et al. | 180/44 F X |
| 4,072,009 | 2/1978 | Daschievici et al. | 60/484 |

Primary Examiner—Joseph F. Peters, Jr.
Assistant Examiner—Michael Mar
Attorney, Agent, or Firm—Edward L. Brown, Jr.

[57] ABSTRACT

A system providing auxiliary power to the non-driving steerable wheels of a four-wheel vehicle utilizing hydraulic power in a parallel circuit from the existing hydrostatic drive system. The steerable wheels are driven by hydraulic motors connected in parallel through a flow divider valve and supplied by the variable displacement pump of the existing drive system through a selector valve which has a free-wheeling position allowing the steering wheels to free-wheel with the return oil from each motor flowing in a closed loop back through the flow divider valve while providing charging pressure to that closed loop circuit.

4 Claims, 1 Drawing Figure

AUXILIARY DRIVE SYSTEM

BACKGROUND OF THE INVENTION

The present invention relates generally to hydraulic drive systems and more specifically to an auxiliary hydraulic drive system utilized on the steerable wheels for an argricultural combine. Generally, a combine comprises a large vehicle body supported on a pair of front main traction wheels and a pair of rear steerable wheels. Under most conditions the main drive wheels provide sufficient tractive effort to propel the combine, however, under certain conditions the main drive wheels may spin out and not provide the necessary tractive force to move the vehicle. Such a condition happens when the grain tank is substantially full and most of the weight of the vehicle is on the rear steerable wheels. With the increased weight on the steerable wheels, it becomes desirable under these conditions to drive the steerable wheels to provide the additional tractive force necessary to propel the combine.

With the advance of recent hydraulic technology, numerous forms of hydrostatic drive systems have been developed for all types of vehicles in either two or four-wheel drive systems. Parallel type drive circuits have some inherent advantages wherein a single pump source supplies two or more wheel motors through a parallel rather than series flow path. In a parallel drive system, differential motor drive speed, inherent in all turning vehicles, creates no problems since the individual wheel motors are independently driven through a parallel flow path. The basic disadvantage of a parallel flow system is that if one wheel motor loses traction and begins to spin, it will absorb all of the flow capacity of the system, robbing any torque from the remaining wheels. One system to solve this spin-out problem has been a valve and corresponding circuitry which shifts the flow from a parallel path to a series path locking all wheels together while the machine is in a spin-out condition. This system has its disadvantages in that it is manual in operation and more importantly, that it has a maximum efficiency of fifty percent tractive effort as compared with the parallel system. Another prior art method is a parallel circuit with individual flow restrictors or flow limiters in the lines to each of the motors as illustrated in U.S. Pat. No. 3,736,732. This type of system is inefficient since one wheel can accept one-half of the total system flow before the flow limiter means begins to function. The most important disadvantage of a flow limiter system of this type is that it cannot have a free-wheeling closed loop circuit when it is desired to disengage the auxiliary drive system and run the vehicle at higher speeds. In the above mentioned patent, to disengage the auxiliary drive system, it is necessary to include a mechanical clutch and brake on each individual wheel which is very complex and expensive. Another method of disengaging the auxiliary drive system on the steerable wheels is to stop the vehicle and mechanically disconnect the gear reduction hubs on the individual wheels which obviously does not lend itself to an environment wherein the two-wheel to four-wheeled mode is frequently changed.

SUMMARY OF THE INVENTION

It is the principal object of the present invention to provide an auxiliary hydraulic drive system for a combine or tractor which is highly efficient in tractive effort which can be hydraulically disengaged into a free-wheeling condition over a wide range of vehicle speeds. The system of the present invention drives the steering wheels of the combine by a pair of hydraulic motors connected in parallel with the main hydrostatic drive system. The system utilizes a flow responsive divider valve which divides the flow from a single source to the individual motors regardless of the flow rate, allowing a prearranged flow differential between the motors for cornering without decreasing the system efficiency. The system includes a selector valve having a freewheeling position which allows the motors to freewheel blocking flow from the drive pump and opening return flow from each of the motors back through the flow divider valve in a closed loop while connecting charging pump pressure to the closed loop. At high vehicle speeds such as road driving, the present system does not require that the auxiliary wheels be mechanically disconnected, as is necessary in the above mentioned system. In the above mentioned patent, this of course would not be possible since the flow limiters would obviously come into play in a closed loop freewheeling condition and prevent any high speed flow.

Therefore the principal object of the present invention is to provide an auxiliary drive system which can by hydraulically disconnected and allowed to freewheel at all speeds.

Another object of the present invention is to provide an improved hydrostatic parallel drive system for vehicles which permits differential operation without a substantial efficiency loss. The invention will be more readily understood when the following description of certain embodiments are described in detail in conjunction with the drawing illustrating the invention in schematic form.

The drawing shows a general arrangement of the novel auxiliary drive system generally identified by reference numeral 10. The auxiliary system 10 is supplied with hydraulic energy by the pump 12 of the main drive system of the vehicle. In a combine application, the front main drive wheels 16 of the vehicle are driven through a conventional reduction gear box and differential axle schematically illustrated by box 15. Box 15 can also include a variable ratio gear box, if desired. Gear box 15 is driven by a reversible hydraulic motor 14. Motor 14 is reversibly driven through either lines 24 or 26 by a variable displacement reversible pump 12 which makes up the main drive system of the vehicle. Pump 12 is driven by the prime mover of the vehicle, usually in the form of an internal combustion engine, not illustrated in the drawing. The closed loop of the main drive system including lines 24 and 26, is maintained in a charged condition by low pressure, low volume charging pump 18 which connects to both sides of the circuit through line 21 and across either check valve 22, the latter of which is provided to prevent high pressure from pump 12 from back-flowing into the charging circuit. Charging pump 18 can be any type of fixed displacement pump, which through the setting of relief valve 20 maintains a constant low pressure in the charging circuit to make up for any leakage in the main drive system. While the drawing indicates that main drive motor 14 is of a fixed displacement, it also can be of a variable flow type similar to pump 12.

Connected to the main drive system in a parallel connection, through lines 31 and 32, are a pair of auxiliary reversible fluid motors 44 and 46. Motors 44 and 46 in turn drive steerable wheels 48 and 50 through planetary gear reduction hubs 47 and 49 respectively. Hydraulic energy from the main drive system is supplied to the auxiliary system in the forward condition; through line 31, selector valve 30, line 37, flow divider valve 40, through which the flow is divided into lines 52 and 53 which in turn supply individual motors 44 and 46. The return flow from motors 44 and 46 passes through lines 54 and 55 respectively; through flow divider valve 42 into a single line 38 back to selector valve 30. Depending upon the position of selector valve 30, the return flow is either directed back to the return side 32 of the main drive system or directly to flow divider valve 40 (position 36) which defines a closed loop within the auxiliary drive system. In position 36, selector valve 30 also connects charging pressure from line 19 into the closed loop of the auxiliary circuit. With selector valve 30 in the 34 position, fluid pressure from pump 12 flows through line 31 to flow divider 40 while the return flow from motors 44 and 46 returns to the main system through line 32. Flow divider valve 42 is only necessary when the system is working in the reverse direction and pump 12 is discharging into line 32 across valve 30 into line 38 where flow divider valve 42 divides the flow equally into lines 54 and 55. In this reverse direction, the return flow from motors 44 and 46 passes through lines 53 and 52 into flow divider valve 40 where they are joined into lines 37 back to selector valve 30. If the system did not require a reverse direction, only one flow divider valve would be required. Fixed restrictions 65, 66, 56 and 57 are shaped to have less resistance for reverse flow so that flow divider valve 42, for example, does not attempt to restrict flow on the return side in a forward condition.

With the vehicle moving in the forward direction and pump pressure flowing in line 31, flow divider valve 40 divides equally the flow from single line 37 to the pair of motors 44 and 46 regardless of the flow rate through valve 40, and allows a prearranged flow differential between the motors for cornering without decreasing the system efficiency. The divider valve 40 includes a shuttle spool having a pair of fixed orifices 65 and 66 in the divided flow paths to the respective motors so that the flow rates to these motors can be sensed due to pressure drops thereacross. The shuttle spool is spring balanced at both ends by springs 74 and 75. Each end of the shuttle spool in conjunction with the valve body forms a variable restriction 67 and 68, both of which are located downwstream from the fixed orifices in the divided flow paths. On opposing ends of the shuttle pool are a pair of opposing servos 70 and 71 which sense the pressure downstream from orifices 65 and 66 respectively, through sensing passages 72 and 73. Whenever the flow rate to one motor sufficiently exceeds the flow rate to the remaining motor, the overall pressure differential on the shuttle spool, as felt in servos 70 and 71, causes the spool to shift and the variable orifice accepting the excess flow begins to restrict flow to maintain the flows the same. As for example, if the flow through motor 46 began to exceed the flow through motor 44, the increased pressure drop experienced across fixed orifice 65 would diminish the pressure in servo 70 thereby causing the shuttle spool to shift upwardly and cause variable restriction 67 to restrict flow to that point when the divided flows equalized.

Positioned in line 31 of the auxiliary system is a flow limiter 28 which limits the maximum flow in the forward direction to the auxiliary circuit to a certain level, so that if both steering wheels 48 and 50 begin to slip, the entire output from pump 12 cannot be wasted on the sliding wheels. Flow limiter 29 located in line 32 has a similar function for the reverse direction flow in the auxiliary circuit. As for example, if the main drive pump 12 was sized for a maximum capacity of 45 GPM; flow limiter 28 would be sized at approximately 28 GPM so that if both wheels 48 and 50 begin to slip, the entire flow from pump 12 could not be wasted and there would be 17 GPM remaining to power main drive wheels 16. With the vehicle moving in a reverse direction and line 32 being the pressure side of pump 12, flow limiter 29 would be set at a lower value of approximately 12 GPM so that in a reverse condition only 12 out of the 45 GPM could be wasted with the remaining 33 GPM being available at the main drive wheels 16 to move the vehicle.

OPERATION

The auxiliary drive system 10 of the present invention would typically be used in a situation where a combine operator was harvesting in a field having marginal traction and the combine was heavily laden with grain so that the primary weight was on the steerable rear wheels 48 and 50. With the auxiliary system in operation in the forward direction, selector valve 30 which is solenoid operated would be energized to the position illustrated by block 34. In this position, the combine would be moving slowly through the field with the pump discharge flowing to main drive motor 14 while part of the pump discharge flow would be passing in line 31 to auxiliary wheel motors 44 and 46. With selector valve 30 in the 34 position, pump discharge flow in line 31 passes through the valve in line 37 to flow divider valve 40. As long as the flow across fixed restrictions 65 and 66 to their respective motors 46 and 44 remains substantially equal, the flow divider valve 40 will not alter the flow through variable orifices 67 or 68. With both wheels 48 and 49 having good tractive effort, the return flow from motors 44 and 46 passes through divider valve 42, line 38 and then to line 32 into the return side of the main pump 12 along with flow returning from the main drive system in line 26. Any loss of fluid in the return side of the auxiliary system 10 or the main drive motor 14 is made up by charging pump 18 flowing into the return side of pump 12 across check valve 22.

If auxiliary drive wheel 50 loses its tractive effort, motor 46 will begin to overspeed since both motors are connected in a parallel circuit. The increased flow across fixed restriction 65 will increase the pressure drop across same, therefore the pressure in servo chamber 70 wil be proportionally less than that in chamber 71 thereby causing variable restriction 67 to restrict its orifice until the flow thereacross becomes substantially the same as the flow across restriction 66 to the opposing motor. Flow divider valve 40 will always maintain a substantially equally divided flow to each motor regardless of the flow rate through the valve. If both auxiliary drive wheels 48 and 50 both lost their traction, flow divider valve 40 would merely maintain equal flows to each motor. As the combined flow rate of both tractionless motors reached the flow limiting level of valve 28, the remaining pump capacity would be available to the main drive wheel motor 14. If the combine was being operated in the reverse direction, flow divider valve 42 would come into play dividing flow from line 38 equally to each motor 44 and 46 with the return flow passing through flow divider valve 40 returning to the pump through lines 37 and 31. Flow divider valve 42 and its respective fixed orifices 56 and 57, variable orifices 58 and 59, and servo chambers 60 and 61 would function in an identical manner as flow divider valve 40, as previously described.

With the combine out of the field and road traveling, a maximum tractive effort is not required, therefore selector valve 30 is placed in its position indicated by block 36 by a solenoid or manual means. With selector valve 30 in this position, the pump discharge pressure is cut-off from the auxiliary circuit and a closed loop is formed between inlet and discharge sides 37 and 38 respectively of motors 44 and 46, so that wheels 48 and 50 may free-wheel. In this free-wheeling position, charging pressure from pump 18 is provided in a line 19 to make up for any losses in the closed loop and prevent any damage to motors 44 or 46. Flow divider valve 40 will continue to function in dividing the flow to each motor, however, the amount of flow through valve 40 provides no limitation upon the system.

In the flow limiter system of the prior art, road speeds of the auxiliary drive motors 44 and 46 are not permissible, therefore the auxiliary system must be completely decoupled from the main drive system.

The auxiliary drive system of the present invention has a similar application on a farm tractor with a conventional mechanical gear box, clutch and drive system. The only difference being that the auxiliary system 10 uses the variable displacement pump which supplies the hydraulic function on the tractor rather than the hydrostatic drive pump 12 as shown in the drawing. The selector valve 30 of such a system automatically shifts to the free-wheeling position when the tractor speed becomes sufficient that the tractor pump can no longer maintain a certain level of pressure. Such an automatic function is triggered by a low pressure responsive switch sensing the pump's discharge pressure.

Having described the invention with sufficient clarity to enable those familiar with the art to construct and use it, I claim:

1. An auxiliary drive system for the steerable non-driven wheels of a vehicle, supplied by hydraulic energy from the pump of the main drive system comprising:
   a pair of auxiliary motors driving the steering wheels of the vehicle;
   a charge pump supplying low pressure fluid to the main drive and auxiliary system;
   a flow divider valve means supplied by pressurized fluid from the pump of the main drive system in a parallel circuit with the main drive wheels, said divider valve means supplies each motor in a parallel circuit, equally dividing the flow to each auxiliary motor regardless of the flow rate by means of a pair of variable orifices which sense the flow to each auxiliary motor and restrict the flow to that motor which exceeds the flow to the other motor;
   a selector valve means positioned in the pump discharge flow path between the flow divider valve and the pump with the return flow from the auxiliary motors passing through the selector valve, the selector valve means having a free-wheeling position blocking flow from the drive pump and opening return flow from each motor back through the flow divider valve in a closed loop while connecting charging pump pressure to the closed loop; and
   flow limiter valve means providing a maximum flow therethrough positioned between the main drive pump and the auxiliary system to prevent total loss of torque to the main drive system when both auxiliary wheels are spinning.

2. An auxiliary drive system as set forth in claim 1, including a second flow divider valve means positioned in the return flow path which joins the return flow from both motors; the second flow divider valve means when the flow is in the reverse direction supplies each motor in a parallel circuit equally dividing the flow to each motor regardless of the flow rate.

3. An auxiliary drive system as set forth in claim 1, wherein the pump of the main drive system is reversible along with the auxiliary motors including a second flow divider valve means positioned in the return flow path which joins the return flow from both motors; the second flow divider valve means when the flow is in the reverse direction supplies each motor in a parallel circuit equally dividing the flow to each motor regardless of the flow rate.

4. An auxiliary drive system for the steerable non-driven wheels of a vehicle, supplied by hydraulic energy from the pump which supplies the other hydraulic accessories on the vehicle comprising:
   a pair of auxiliary motors driving the steering wheels of the vehicle;
   a charge pump supplying low pressure fluid to the auxiliary drive system;
   a flow divider valve means supplied by pressurized fluid from said pump supplying each motor in a parallel circuit, equally dividing the flow to each motor regardless of the flow rate by means of a pair of variable orifices which sense the flow to each auxiliary motor and restrict the flow to that motor which exceeds the flow to the other motor;
   a selector valve means positioned in said pump discharge flow path between the flow divider valve and the pump with the return flow from the auxiliary motors passing through the selector valve, the selector valve means having a free-wheeling position blocking flow from said pump and opening return flow from each motor back through the flow divider valve in a closed loop which is supplied with charging pump pressure in said free-wheeling position.

* * * * *